April 29, 1924.

C. H. QUARLES 1,492,336

VENT CONTROL VALVE FOR TRAIN CONTROLLING MECHANISMS

Filed Nov. 7, 1922    2 Sheets-Sheet 2

Inventor
Charles H. Quarles
By
Attorneys.

Patented Apr. 29, 1924.

1,492,336

UNITED STATES PATENT OFFICE.

CHARLES H. QUARLES, OF CHARLOTTESVILLE, VIRGINIA, ASSIGNOR TO AMERICAN AUTOMATIC TRAIN CONTROL CORPORATION, OF BALTIMORE, MARYLAND, A CORPORATION OF MARYLAND.

VENT-CONTROL VALVE FOR TRAIN-CONTROLLING MECHANISMS.

Application filed November 7, 1922. Serial No. 599,490.

*To all whom it may concern:*

Be it known that CHARLES H. QUARLES, a citizen of the United States, residing at Charlottesville, in the county of Albemarle and State of Virginia, has invented certain new and useful Improvements in Vent-Control Valves for Train-Controlling Mechanisms, of which the following is a specification.

This invention relates to an improved vent control valve for use in conjunction with electro-pneumatic train-controlling mechanism.

The invention has direct reference to an improvement on the valve-structure shown and described in my United States Patent Number 1,439,482 granted December 19th, 1922.

In my said prior invention I utilize a valve device in the air-brake system of a train-controlling mechanism which automatically operates and conforms to the variation of pressures utilized in the main reservoir and train-line of the air-brake system, and the apparatus of that patent has the function of automatically controlling the quantity of train-line pressure vented to the atmosphere and allow only a predetermined amount of pressure to escape so as to permit a reduction in the train-line of only a predetermined amount of pressure, irrespective of what the train-line pressure might be at the time of the beginning of the reduction of such pressure.

The present invention is therefore directed to an improvement to the vent-control valve shown in my said patent, and while it has the same objects in view as recited in that patent, it has for its further object to provide means whereby the engineer will be unable to prevent an automatic application of the brakes by placing the handle of the automatic brake-valve in full release position.

Another object of the present invention is to provide an improved vent-control valve whereby when an automatic application of the brakes is made, it will be accomplished through a graduated or slower vent thereby effecting a smoother stopping of the train or vehicle.

A further object is to provide means whereby the ill effects of a broken-weak or improperly adjusted regulating spring are overcome.

In illustrating the invention I find it necessary to duplicate the mechanisms shown in my said patent for a proper understanding of the present improvement and as the two inventions are very closely allied much of the descriptive matter is also duplicated.

The invention is illustrated in the accompanying drawings, wherein,—

Figure 1:
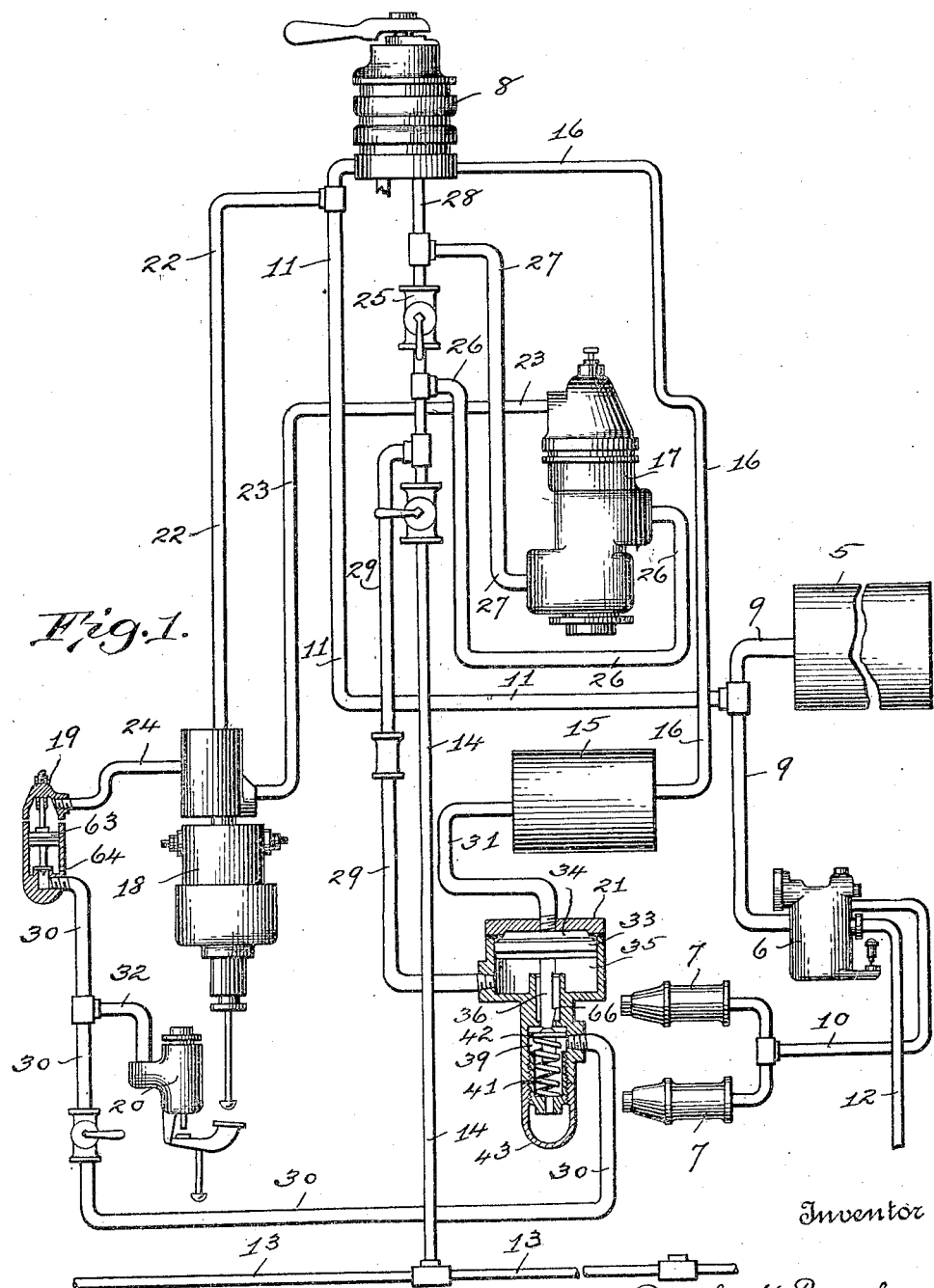

Fig. 1. shows in a diagrammatic way, the engine air-brake equipment and valve devices including my improved vent-control valve.

Figure 2:
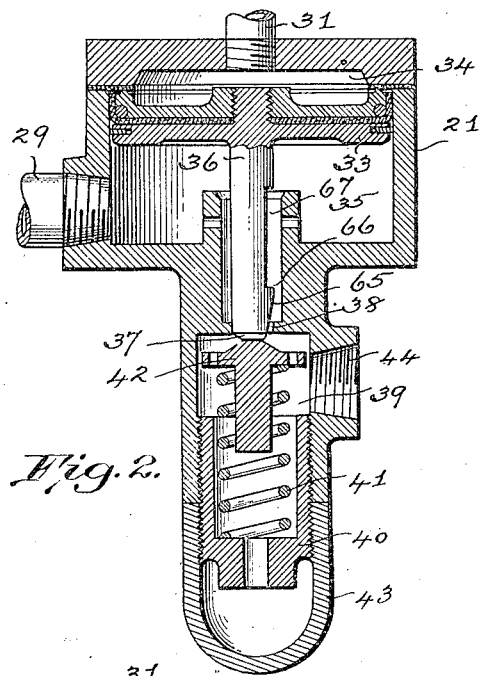

Fig. 2. illustrates the improved vent-control valve in vertical section with the parts in the normal running position.

Figure 3:
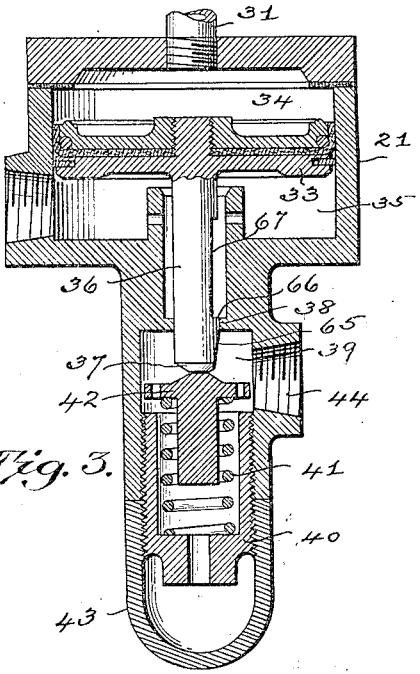

Fig. 3. shows the same devices but with the parts in the positions they assume after a service application of the brakes.

Figure 4:
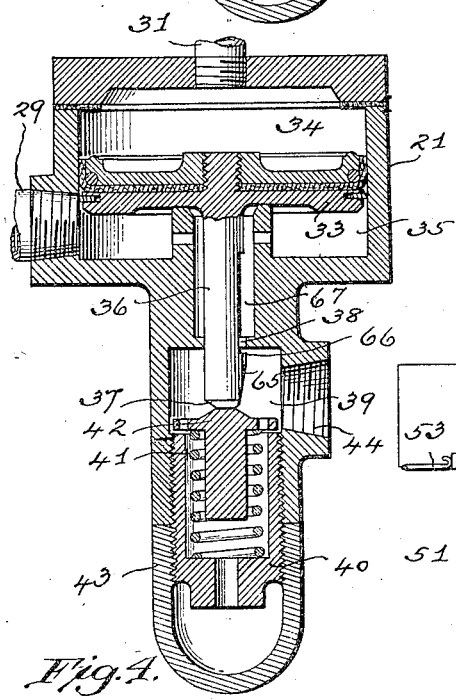

Fig. 4. illustrates the same devices but with the parts in the positions they assume after an application that has resulted from a broken or weak regulating spring.

Figure 5:
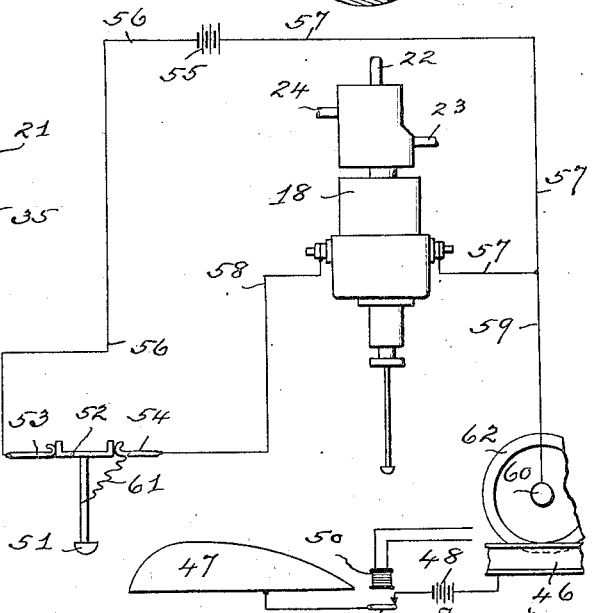

Fig. 5 shows a diagram of the trackway and vehicle circuits.

Referring to Fig. 1. of the drawing it will be noted that the engine or vehicle includes the following features or devices in its air-brake equipment, to wit:

A main reservoir 5, distributing valve 6, brake-cylinders 7, an engineer's valve 8; pipe connections 9 between the main reservoir 5 and distributing valve 6; pipe connections 10, between the distributing valve 6 and brake cylinders 7 and pipe connections 11 between the engineer's valve 8 and the main reservoir 5 and distributing valve 6. It will also be noted that a pipe 12, connects the distributing valve 6 with the train-line and engineer's valve 8, all in the usual manner in the well-known Westinghouse E T 6 air-brake equipment.

In carrying out my invention I also employ with the engine equipment an equalizing or other air-storage reservoir 15, which is charged with air-pressure by a pipe 16, through the engineer's valve 8, from the train line pipe 13 and branch 14, and I further employ what I term a train-line blanking valve 17; a magnet-valve 18, a vent valve 19 and a reset-valve 20, most of which are features that are illustrated in U. S. Patent 1,240,796 granted September 18th, 1917, to Thomas W. Scott.

To the above devices I have added my improved automatic vent-control valve 21, which is utilized by me to control the venting of a predetermined amount, of train line pressure through the vent-valve 19, to the atmosphere, and this vent-control valve 21, is interposed somewhere between the train-line and the vent to the atmosphere from the train-line, and is itself subject to the pressure that is contained in the equalizing or other storage reservoir 15.

From the main-reservoir-pipe 11, I provide a branch 22, which connects with the magnet-valve device 18; I provide a pipe 23 to connect the magnet-valve 18 with the blanking valve 17 and a pipe 24, to connect the magnet-valve 18, with the vent-valve 19. It will thus be understood that all of the pipes 9—11—22—23 and 24 are normally charged with air under main-reservoir pressure.

The blanking valve 17, is interposed between the train-line 13 and the engineer's valve 8 by reason of the fact that a cut-out cock 25, is normally closed in pipe 14, so that the train-line pressure must pass by a branch 26, to the blanking-valve 17, and by a branch 27, from the blanking-valve 17 to the pipe 28, and engineer's valve 8. By this means the engineer can only vary the train-line pressure through the blanking valve 17, and if the latter has been cut-off by an automatic operation of the brakes, no manipulation of the engineer's valve can recharge the train-line to release the brakes as long as the blanking valve is cut-off. This feature of operation is set forth in Letters Patent of the United States No. 1,318,925 granted October 14th, 1919, and a detailed description is believed to be unnecessary here.

By again referring to Fig. 1, of the drawing, it will be seen that a pipe 29, leads from pipe 14, and connects with the improved vent-control valve 21; that another pipe 30, leads from the vent-control valve and connects with the vent valve 19, and that a pipe 31, connects the equalizing or other air-storage reservoir 15, with the improved vent-control valve 21.

A branch pipe 32, from vent pipe 30 to reset valve 20, is also provided for a purpose presently to be explained.

By reference to Figs. 2—3 and 4 of the drawing wherein the vent-control valve is illustrated, it will be noted that the valve comprises a casing or housing 21, having on its interior a piston 33, which produces an upper chamber 34, and a lower chamber 35 at the opposite sides of the piston. The piston has a stem 36, with a lower end 37 which enters and projects slightly through a port 38, that opens into a lower spring chamber 39 in the valve casing 21.

In the lower end of the spring chamber 39, there is provided a cylindrical adjusting nut 40, which may be screwed more or less into the end of chamber 39 whereby to vary the length of said chamber.

A coiled spring 41 is confined in the chamber 39, and has its lower end seated in the adjusting nut 40, while its upper end is engaged by a central depending pin or stem on the under side of a spring guide 42.

This spring guide device has position directly under the port 38, and in the path of the lower end 37, of the stem so that when the piston and its stem move downwardly the end 37, will make a preliminary movement to contact with the spring-pressed guide 42, and will then make a final movement against the action of the spring 41. It is to be understood that the guide device 42, is not in any sense a check-valve for port 38, but is simply a perforated disk which serves as a yielding abutment for the lower end of the piston stem. Obviously by vertically adjusting the nut 40, the spring-pressure of the guide 42, may be increased or decreased and after the adjustment has been made a cap 43, on the lower end of the nut will lock the latter in the adjusted position.

From the lower spring-chamber 39, there is a passage 44, with which pipe 30, connects so that said chamber is in communication with the vent-valve 19.

Chamber 35, at the under side of the piston 33, and above the port 38, is in communication with pipe 29, and is therefore subject to the pressure and variations of pressure in the train-line 13, and pipe 14.

The lower end 37 of the stem 36 in this improved valve has a beveled face 65 which broadens as it extends upwardly to the cut-off point 66, and above this cut-off point the stem 36 has a side notch 67 which extends upwardly along the stem.

It will thus be understood that the lower end 37, of the stem 36 controls communication between the train line 13, and the vent-valve 19, and that as the port 38, is normally open there is a normal communication between the train-line and the vent-valve casing 19 through the chambers 35 and 39 of the vent-control valve.

Normally the reservoir 15, pipe 31, chamber 34, chamber 35, pipe 29, chamber 39 and pipe 30, are all charged with air at the pressure of the air in the train-line, and it is through the unbalancing of these pressures and reducing the pressure on the under side of the piston 33, that operation of the vent-control valve is effected.

It is important to understand that the spring 41, which forms the yielding abutment for the piston stem and which must be compressed as the end 37 of the stem 36 moves down through port 38, is adjusted to exert a pressure of twenty or twenty-five pounds, more or less, and that this spring pressure is to determine the amount of air, in pounds, that will be permitted to escape or be vented before the venting will be cut-off. In other words, instead of wasting air pressure by venting more than is necessary to effect an application of the brakes, this vent-control valve will permit only so many pounds of air to be vented as is necessary to overcome the action of the spring 41, and when that many pounds of air has been reduced or vented, then the face 65 of the stem 36 will seat in the port 38 and thereby prevent further and unnecessary venting and waste of air-pressure.

Obviously the pressure of the spring 41, is in excess or is additional to the air-pressures confined in the several passages and chambers of the casing 21, and while the air-pressures vary, the spring pressure remains the same and may be overcome as long as there is an air-pressure in the valve in excess of the spring pressure.

The structural features involved in the present invention lie in the form of the piston stem 36 and its end 37 with the cut-off faces 65, and 66; the side-notch 67, and their operation in closing the port 38, and the effect on the operations of the air-brake system because of these features.

Figs. 2—3 and 4 of the drawings show the present improved vent-valve in its several positions which will now be explained.

Referring to Fig. 2, wherein the piston, stem and valve-parts are all shown diagrammatically in the normal position it will be noted that the pressures in the chambers 34—35 and 39 are all presumed to be balanced and the piston 33 is in its highest position.

When an automatic application of the brakes is made by the train-control devices, train-line air from chamber 35, will pass through the side notch 67 in the piston-stem 36; then through port 38 to chamber 39 and from the latter will pass out through port 44 to and through pipe 30 and vent-valve 19 and vent to the atmosphere. As the original normal pressure in upper chamber 34 has not been reduced in this operation while the pressure in chamber 35 has been lowered, the piston 33 will be forced downwardly by the greater pressure in upper chamber 34 and the stem 36 will engage the disk 42 and compress the spring 41 until the cut-off face 66 on the piston stem entirely closes the port 38. While the downward movement of the piston 33 and its stem will be arrested by the spring 41 when the port 38 is closed by the cut-off face 66, this movement may be termed a preliminary movement because it is not the extreme downward movement which the piston and stem can make, as is the case in my said patent.

When the piston and its stem have made the preliminary downward movement just described, they will assume the positions shown in Fig. 3 wherein port 38 will be closed and passage of train line pressure from pipe 29 and chamber 35 through the port 38 will be cut-off from further escape through chamber 39 and pipe 30 to the atmosphere. This cutting off of the train line pressure is effected by the compression of the spring 41 so that if the spring is set to withstand a pressure of any predetermined amount it will hold the stem in the cut-off position it has when that reduction of pressure has been made. By this means only a sufficient reduction of train-line pressure will be made to produce an application of the brakes and when that reduction has been made further escape of pressure will be cut off so that a waste or depletion of the train line pressure will be avoided and a restoration of the pressure in the train-line to release the brakes will be more rapidly accomplished.

It is important to note that during this automatic operation of venting the train-line pressure to apply the brakes, that the beveled or tapered face 65 on the piston-stem will effect a gradual closing of the port 38 until the cut-off point 66 on that face completely closes the port and stops the venting. This gradual closing produces a graduated vent and thereby effects a smoother stopping of the train over the structure in my said patent wherein the port 38 is suddenly closed.

Of course, when the brakes are released, the pressure in the train-line; the pipe 29, and chambers 35 and 39 will be restored thereby raising the piston 33 and return the control-valve parts to their normal positions.

By reference to Fig. 4 it will be noted that the piston 33 and its stem 36 are in their extreme lowermost positions, which is lower than the preliminary downward position shown in Fig. 3 to cut off the port 38.

This extreme or further movement of the piston and its stem is also a novel feature in this case, and is provided so that in case the spring 41 should fail to function because of improper adjustment or because of a break in the spring, the venting of the train-line will still be accomplished by allowing the stem to make a further downward movement and thus provide an additional vent through the side notch 67 which will then extend down through the port 38.

In this latter case, the piston will move down; the port 38 will be momentarily closed when the cut-off point 66 passes into the port, but as the spring 41 fails to function, the stem will continue to move down until the side notch 67 will form a by-pass and allow the venting to continue. The brakes will therefore be applied notwithstanding the failure of the spring to function. This feature is therefore an emergency one and prevents a failure of the apparatus to function because of a broken or improperly adjusted spring. This is also a novel feature of the present invention.

As is common in train controlling mechanisms to which the present invention is applicable, the automatic operation of the devices on the engine or vehicle is effected through the operation of electrical circuits that are maintained or are interrupted through the movement of a contact shoe which shoe-movement is caused by ramp rails along the trackway. As this feature is not novel in the present invention, a diagrammatic illustration of the circuits and parts included in said circuits is deemed sufficient in connection with a brief description of the same, reference being made particularly to Fig. 5 of the drawing.

The track-rail is designated 46, and is usually insulated at intervals to form trackway sections. Ramp-rails 47, are provided, also at intervals along the trackway, and said ramp-rails are connected with or disconnected from a current-supply 48, through the armature 49, of a track relay 50. When the block or section is clear the relay 50, will be energized and one side of the battery 48, will be electrically connected with the ramp-rail 47.

The vehicle carries a contact shoe 51, which latter is connected with a switch 52, which normally engages two contacts 53 and 54. An electromagnet-valve device 18, is carried on the vehicle, as is also a current supply 55, and one side of the current supply is connected by a wire 56, with, say contact 53, while the other side of the current supply is connected to the magnet-valve by a wire 57. The other side of the magnet-valve is connected by a wire 58, to the other shoe-switch contact 54. By means of these connections, as long as switch 52, is closed the electro-magnet valve 18 will be energized and the main-reservoir air-pressure in pipes 22—23 and 24, will be maintained.

A wire connection 59, is also provided on the vehicle to the axle 60, thereof. while a branch wire 61, is provided from the shoe 51, to the contact 54.

When the shoe rides up onto a ramp-rail 47, the switch 52, will be opened and the normal circuit from battery 55, through the magnet-valve 18, will be interrupted, but if the track is clear, relay 50, will be energized and armature 49, will be up so that current from the ramp-rail current-supply 48, may pass to the ramp-rail; then to the shoe 51; then by wire 61, contact 54 and wire 58 to the magnet-valve 18, which will be kept energized and the return for this picked-up current from the magnet-valve will be by wires 57 and 59 to the axle 60, then through the wheel 62, to track-rail 46, and back to the ramp-rail current-supply 48.

If, however, the track-relay 50, is deenergized, which it would be if the track ahead is occupied, then armature 49, will be down and the connection to the ramp-rail 47, from current supply 48, will be broken so that the shoe 51, cannot pick up current from the ramp.

In this latter event the ramp-rail would operate the shoe and interrupt the normal vehicle circuit thereby deenergizing the valve-magnet 18, and causing an automatic operation to apply the brakes.

This operation is effected as follows:

When magnet-valve 18, is deenergized the valve on the interior thereof will move so as to cut off the main reservoir pipe connection 22, and to open a vent from the interior of the magnet-valve to the atmosphere. The opening of this vent exhausts the pressure in the vent valve 19; pipe 24; the pipe 23, and an interior chamber in the train-line blanking valve 17.

The operation in the blanking valve is to cut off connection between the train-line and the engineer's valve 8, so the engineer cannot interfere with the automatic operation of the brakes, but the train-line pressure to the vent-control valve 21, is not affected by any operation in the blanking valve 17.

In the vent valve 19, there is a piston 63, which normally is held down by main reservoir pressure so as to cover ports 64 to the atmosphere. The under side of this vent-valve piston is subject to train-line pressure from pipe 30, and as the main reservoir pressure is always in excess of the train-line pressure, the greater pressure on the upper side of the vent-valve piston 63, will hold that piston down against the lesser train-line pressure in pipe 30. When, however, that greater reservoir pressure on the upper side of the vent-valve piston 63, is vented through the magnet-valve 18, then the train-line pressure on the under side of the piston 63, will move the latter up and uncover the ports 64, so the train-line pressure can and will vent to the atmosphere.

It is right at this moment of the operation of the apparatus that the improved vent-control valve 21, of this application begins its automatic operation.

By again referring to Figs. 2—3 and 4 of the drawing it will be noted that when the vent valve 19 is opened to begin venting train-line pressure from pipe 30, that a reduction in the air-pressure in pipe 30, chamber 39 and piston-chamber 35, of the vent-control valve 21, will immediately follow, because the vent-control valve is interposed between the train-line and the said vent-valve 19.

Immediately upon a reduction of pressure in chamber 35, of the vent-control valve, the piston 33, will move down until the lower end 37 of its stem contacts with the yielding spring-guide 42.

The piston 33, will then be subject to a combined air and spring pressure on the under side, and an air-pressure only, on the upper side so that when the air-pressure on the under side of the piston is reduced until the pressure above is twenty pounds or slightly more than the combined air and spring pressure on the lower side, then the spring will yield under the greater upper pressure and allow the beveled face 65 of the stem to close the port 38, and thereby cut-off the flow of air from the pipe 29, and train-line through the chamber 35, so that when the predetermined reduction of train-line pressure, sufficient to apply the brakes has been made, further reduction of train-line pressure will be prevented by the vent-control valve, and waste of air is prevented when the automatic application is made.

After the automatic application and stop has been made the apparatus may be restored to its normal condition by resetting the valve-magnet 18, and again admitting main reservoir pressure through pipes 22—23 and 24. When this is done, the piston 63, of the vent-valve will move down and close the vent ports 64; the piston in the blanking valve 17, will also be restored to normal by the main reservoir pressure and again establish communication between the train-line and engineer's valve.

As the train-line pressure is then built up, that pressure in pipe 29, and chamber 35, of the vent-control valve will cause piston 33, to move back to its normal position.

It will thus be seen that the pressure of the spring 41, is so utilized that it will limit the quantity of air that is vented from the train-line and when sufficient air to operate the brakes has been vented the spring will yield and allow the plug-valve 37, to cut off and prevent further venting, and in case the spring 41 should fail to function, the piston will make a further downward stroke to continue the venting so that a failure to get the automatic stop will be prevented.

Having described my invention, I claim,—

1. In an automatic train controlling mechanism for vehicles the combination with a vehicle having an air-brake system including a train-line and a vent means to reduce the pressure in the train line to effect an application of the brakes, and an automatic vent-control device having means to effect a graduated venting of the train line until it stops said venting when a predetermined reduction in train-line pressure has been automatically made.

2. In an automatic train controlling mechanism for vehicles the combination with a vehicle having an air-brake system including a train-line and a vent means to reduce the pressure in the train line to effect an application of the brakes, an air-storage means; an automatically movable air-vent control device having one side subject to the pressure in the storage means and its other side subject to the decreasing pressure caused by the venting of the train line said air-vent control device having means to effect a graduated venting of the train-line pressure until it cuts off the escape of train-line pressure upon a predetermined reduction of that pressure.

3. In an automatic train controlling mechanism for vehicles the combination with a vehicle having an air-brake system including a train-line, a vent device to reduce the pressure in said train-line to effect an application of the brakes, an air-storage reservoir charged from train-line pressure, and a vent-control device having a piston with a connection from one side of the piston to the said storage reservoir, a connection from the other side of the piston to the train-line and a third connection to the said vent device and valve-means actuated by the piston to gradually cut off communication between the said vent device and that side of the piston which communicates with the train-line.

4. In an automatic train controlling mechanism for vehicles the combination with a vehicle having an air-brake system including a train-line, a vent device to reduce the pressure in said train-line to effect an application of the brakes, an air-storage reservoir charged from train-line pressure, and a vent-control device having a casing with a piston-chamber and a spring-chamber, a piston in the piston-chamber, a connection from the upper side of the piston to the said reservoir, a connection from the under side of the piston to the train-line, a connection from the spring-chamber to the said vent device, a valve moved by the piston to gradually cut off communication between the piston and spring-chambers, and a spring in said spring-chamber to hold the valve from its seat.

5. In an automatic train controlling mechanism for vehicles the combination with a vehicle having an air-brake system including a train-line and a vent means to reduce the pressure in the train line to effect an application of the brakes, a vent-control device having a casing with a piston therein, a connection for supplying pressure to the upper side of the piston, a connection from the under side of the piston to the train-line and means in said vent-control device for graduating the venting of the pressure from the under side of the piston to the said vent means.

6. In an automatic train controlling mechanism for vehicles the combination with a vehicle having an air-brake system including a train-line and a vent means to reduce the pressure in the train-line to effect an application of the brakes, a vent control device interposed in the system between the said vent device and the train-line said vent-control device having a piston-chamber and a spring-chamber, a connection for supplying pressure to one side of the piston, a connection for train-line pressure to the other side of the piston and the spring-chamber, a connection from the spring-chamber to said first-named vent means and means actuated by the piston to effect a graduated venting of the train-line pressure from the side of the piston to the said first-named vent-means.

7. A vent-control valve for automatic train-controlling mechanism comprising a casing having a piston chamber, a piston in said chamber, a pressure-supply connection at one side of the piston, a train-line pressure connection at the opposite side of the piston, spring means against which the piston operates when the train-line pressure is reduced and means moved by the piston to gradually cut off the reduction of the train-line pressure when the spring has compressed to a predetermined point.

8. A vent-control valve for automatic train-controlling mechanism comprising a casing having a piston chamber, a piston in said chamber, a pressure-supply connection at one side of the piston, a train-line pressure connection at the opposite side of the piston, spring means against which the piston operates when the train-line pressure is reduced, means moved by the piston against the action of the spring to gradually cut off the escape of train-line pressure and means in case the spring fails to function to effect a further reduction in the train-line pressure.

In testimony whereof I affix my signature.

CHARLES H. QUARLES.